Dec. 31, 1968 F. C. DOUGHTY 3,419,856

WIRING ARRANGEMENT FOR A THIN FILM MAGNETIC MEMORY

Filed Aug. 10, 1964

INVENTOR.
FREDERIC C. DOUGHTY
BY Kenneth L. Miller
ATTORNEY

INVENTOR.
FREDERIC C. DOUGHTY
BY Kenneth L. Miller
ATTORNEY 3,419,856

WIRING ARRANGEMENT FOR A THIN FILM MAGNETIC MEMORY

Frederic C. Doughty, Valley Forge, Pa., assignor to Burroughs Corporation, Detroit, Mich., a corporation of Michigan Filed Aug. 10, 1964, Ser. No. 388,553

19 Claims. (Cl. 340—174)

ABSTRACT OF THE DISCLOSURE

A magnetic memory is provided with a stack of memory planes containing magnetic storage elements. Each memory plane can store a group of words and all of the bits of each word it stores. Word and bit lines are wired so as to restrict currents to a single selected plane, and so as to minimize noise voltages induced into sense lines, and to minimize delay of signals. Noise is further reduced by driving bit lines through transformer and diode networks. Driver circuits for the bit lines are operated selectively to both energize selected transformer and diode networks for driving selected bit lines and to quench the energy in the selected transformers to obtain rapid transformer recovery.

This invention relates in general to memories and more particularly to thin film magnetic memories wherein large numbers of words of information are stored.

Recently, memory designers have concluded that thin film storage techniques are in fact applicable to storage systems requiring considerable word storage capabilities. Some of the early forms of magnetic thin film storage memories successfully proved that such memories could operate more expeditiously than ferrite cores. However, such prior practical systems have been limited to single planes. A description of the pioneering efforts in using thin film memories is contained in a paper presented at the International Conference on Nonlinear Magnetics held at Washington, D.C., in April of 1963. The paper presented by Eric E. Bittmann titled "Thin Film Memories: Some Problems, Limitations, and Profits" describes some of the basic techniques to be used. In that paper the author describes in detail a memory including a single film plane, and the teaching of that article is herein incorporated by reference for its background. In that arrangement the thin films are organized in word fashion with a word conductor being aligned with the easy axis of magnetization of the individual film spots constituting a particular word. The sense conductor is applied to the corresponding bit positions of each of the words of the plane and is positioned transverse to the word drive conductor. A further information or bit conductor is likewise transverse to the word drive conductor for each bit position and is parallel to the individual sense conductors. In that paper the author recites a major problem involved in constructing a practical memory. That problem is undesirable noise which is both of an inductive and a capacitive nature. The capacitive noises are usually extremely difficult to eliminate. One such capacitor, for example, exists at the cross-over point between a word conductor and a sense conductor. At the time of current switching on a word conductor, the individual capacitor at this cross-over point is caused to discharge, thus creating noise signals in the sense conductor at the time that sensing or interrogation is desired. One manner of eliminating this difficulty is to include transformers between the word switching circuits and the individual word lines. Inductive noises are most often encountered during the writing operation when the information in the bit conductors causes noise voltages to be induced into the sense conductors. The Bittmann article describes a technique for minimizing this undesired noise wherein the sense conductor surrounding an individual plane is caused to have its leads transposed in the middle of the plane so as to effectively cancel out the inductively induced noise voltages caused by current flowing through bit conductors.

When operating thin film memories under the higher frequency conditions which make them considerably more attractive than ferrite cores, it is desired to accomplish a complete memory cycle within fractions of microseconds, and therefore the individual delay times of current flowing through the conductors and unnecessary delays to eliminate noise pulses become a very significant problem. The Bittmann article also describes a manner of actual tuning of each individual sense line within a memory plane by manually twisting a small wire loop at each sense or bit line end to reduce the bit noise. The author points out that unfortunately each sense line couples to all information lines in the plane and bit noise is caused by a number of currents. The process of tuning an individual plane requires about one to two hours.

The present invention is based upon an extension to the techniques disclosed in the Bittmann article and teaches a practical technique for eliminating noises caused by the information or bit lines when expanding the single plane memory to one containing a large number of planes. The planes may be conveniently arranged into a stack. The Bittmann article further forecasts some of the problems and difficulties which would be encountered in large memory designs. Basically the problems in such large memory arrangements include the fact of delays caused by current flowing through conductors serially threaded through the individual planes of such a stack. The major problem, however, is that of cancelling the noise voltage pulses induced into the sense lines by the individual bit currents of the various information transistors switched on during the writing cycle. Although it is possible to individually tune the separate conductors within a single plane, it is a virtual impossibility to so tune the conductors when they are arranged in a stack of similar planes. A principal problem encountered when extending this technique to a stack arrangement is that one cannot predict in which fashion the voltages will add in their algebraic summation to the separate sense circuits.

In a word organized stack memory, the conventional arrangement is for a single plane to store one bit position for all words. In other words, for a thirty-two bit word there would be a conventional requirement of thirty-two planes with each plane storing one bit position for a selected word for each of the total possible number of selected words. However, the present invention departs from the conventional word organized arrangement by restricting all the bit currents to a single selected memory plane. In this fashion the selected plane may contain, for example, 128 words of memory, and during the writing operation the word drive and the information bit currents are restricted to the individually selected plane and are in effect isolated from the other planes. The sense lines, on the other hand, may be effectively series connected through all of the bits in the stack for connection to common sense circuits. Therefore the sense conductor is not restricted to an individual plane, whereas the bit conductor is in the arrangement of the present invention.

In the present approach, all current connections in the bit line selection scheme are eliminated through the utilization of four diodes per bit. This technique further reduces noise voltages and for the first time permits the extension of thin film magnetic memories or magnetic toroid or other memory forms for that matter to a full stack arrangement. In the present scheme the bit selection technique utilizes a transformer in every bit line. The secondary winding of each transformer connects to the corresponding bit line terminals. Further, two separate primary windings for each transformer are used in order to maintain a balanced drive. It is to be understood, however, that a single primary winding could be used if desired. There is a requirement of four diodes, two for positive current and two for negative current, in series with the primary windings when two such windings are used. The use of this configuration including four diodes plus a double primary winding transformer for each bit line is economically justified in view of the remarkable improvement in signal characteristics which have been realized. Further, this configuration has the added advantage that regardless of the data to be stored, the same level of current flows through a selected bit switch. The bit switch is included in this technique in order to enable a single selected plane out of the stack of memory planes. The balanced drive arrangement eliminates ground currents which greatly add to the noise problem.

A scheme has been proposed which permits the effective serial connection of many planes along the sense line while apparently connecting the planes in parallel. This permits each plane to be treated as a single noise cancelled unit. This approach is covered in a co-pending patent application in the name of the same inventor as this current application identified as Ser. No. 344,877, filed Feb. 14, 1964. If the bit current for each bit per word is wired serially throughout the stack, the aforementioned residual noises plus the increased propagation delay become severe problems. A true parallel connection for the bit conductors would eliminate the delay problem but is not actually feasible because of an unpredictability as to how the current would split into the many parallel branches and because of the exceedingly large current requirements that would be imposed upon such a parallel system. The present invention allows the use of an effective parallel connection by energizing only one of the memory planes in a unique fashion. The bit current during any one cycle, therefore, introduces a residual noise into the respective sense system from only one plane. In this fashion the separate tuning of the bit or information lines of the individual planes is deemed sufficient to enable operation of a practical multiplane memory array. In the present technique the physical location within the memory stack of a word being written into is known by virtue of an examination of word decoding. This information then controls a selection scheme which routes the bit current to the single plane containing the desired word.

The selection scheme of the present invention includes a bit switch and this switch must be capable of handling the necessary bit current per bit line times the number of bit lines in any one selected memory plane. This total current in a practical system would approximate a high value. However, the utilization of a pair of transformer primary windings for the bit drive enables a technique for keeping this current at a relatively low level. To accomplish this in an example of the principal embodiment of this invention, applicant uses a turns ratio at the transformer to step up the bit current level by four times to achieve the necessary bit current. In this fashion the controlled or switched current per bit might be only one-fourth the actual bit current used in the magnetic thin film area of the plane.

The present invention is proposed for a complete cycle operation of a maximum of one-half microsecond, and accordingly delay times required to dissipate energy in any of the lines must be held to an absolute minimum. The present invention actually utilizes a bipolar driver circuit in order to force recovery of a residual amount of energy accumulatively stored in the bit transformers. Under a normal operation at the desired high frequency, a transformer would be unable to dissipate to the system the energy left in the core, and therefore successive operation would store additional energy. However, applicant has found that he may apply the recovery technique disclosed in copending application Ser. No. 255,386, filed Jan. 31, 1963, now Patent No. 3,234,407, and assigned to a common assignee, into the overall arrangement of this memory system. In this manner the bit driver circuit incorporates a bipolar signal each time a bit current is required. The first portion of the bipolar pulse, whether positive or negative, is chosen to be of the same absolute amplitude and time duration. The amplitude of the second portion of the bipolar pulse is chosen to be the same whether positive or negative so as to use a uniform source and in this instance is selected to be of the same absolute amplitude as the first portion of the bipolar pulse. The time duration of the second portion is the same whether positive or negative, but is somewhat shorter than the first portion of the bipolar pulse. The amplitude and duration of the second portion is selected so as to cause the energy in the core of the transformer to rapidly dissipate itself at a time prior to its next subsequent energization. Normally it is desirable to have this recovery take place in as quick a time as possible. The system has also been designed to confine all currents to predictable paths through the utilization of balanced transmission lines where needed. The use of such balanced transmission lines prevents radiation from these lines into the high impedance sense circuits, such radiation also appearing therein as noise.

Accordingly, one of the objects of the present invention is to present a wiring arrangement which minimizes noise voltages induced into a sense circuit.

Another object of the present invention is to provide a wiring arrangement in a memory wherein four diodes and a transformer for each bit line eliminates undesired ground currents thereby minimizing noise signals.

A further object of the present invention is to enable an entire stack assembly including a plurality of memory planes wherein an effectively series connected sense line for the individual bit positions may be considered as effectively threaded through each of the planes of a stack. The individual bit conductors, however, are restricted to a single plane within a stack thereby minimizing delay of bit signals and induced noise voltages into the sense circuits.

A further object of the present invention is to include a bit switch for each individual plane of a memory stack capable of handling the currents required for each of the bit lines in a selected word. In the present arrangement where a very large number of bits may appear in any selected word within a single plane, it is possible to group the individual bits within a plane with separate bit switches within their current handling capabilities. Furthermore, the currents handled by the individual bit switches may be kept within reasonable limits through the utilization of the bit transformers wherein is a current step-up between the primary and secondary windings of such transformers with the secondary windings being connected to the individual bit lines.

A brief description of the present invention may be more readily understood by considering a specific example of a configuration actually constructed. In the chosen example a stack may include thirty-two separate planes. Each memory plane may have 128 words with each word including 120 bits. In order to perform a write operation into a selected word, it is necessary to cause a word current to flow through the chosen word line within one of the memory planes. This may be accomplished through the use of an address decoding matrix which forms no part of the present invention. During the occurrence of the word drive current, it is also necessary to cause information current to flow within each of the 120 bit conductors which are located in the respective bit positions within the single selected memory plane. An information switch which selects the plane to which the bit currents are subsequently applied may be preselected early within the memory cycle. However, the information driver circuits are not energized until the appropriate time within such cycle. In the present invention the 120 bit lines are each contained wholly within an individual plane and may be tuned with respect to the associated sense lines so as to eliminate noises due to unbalancing. The actual tuning may take place apart from the memory stack and subsequent placement within the stack does not adversely affect the tuning. Similarly, this operation may be accomplished for each of the bit lines within the separate thirty-two planes described in this example.

There are 120 bit distribution or transmission lines which may be placed along side the individual bit conductors and running from the bottom plane to the top plane of the memory stack. During a normal writing operation a word line is driven and coincident with that word energization each of the 120 bit distribution lines is energized with a proper polarity bit pulse. Actually, as will be described hereinafter, applicant chooses to use a bipolar bit driver with the second pulse of each sequence serving to cause the bit transformers to have their energy rapidly quenched in order to speed up the overall operation. Considering a single one of the 120 bit distribution lines, applicant proposes to drive the transmission lines through a transformer coupling arrangement attached to the midway point of the line for proper balancing. There are take off points along the distribution line providing bit current to each of the thirty-two individual planes. The take off points actually are connected to separate primary windings of bit transformers at each of the thirty-two plane levels. Effectively, therefore, the bit driver is driving thirty-two parallel bit circuits. A novel unipolar information switch is connected to each of the bit transformer primary windings and selects one out of the thirty-two planes, permitting the bit current to be coupled to the single selected plane. The remaining thirty-one planes all appear as high impedance lines in parallel and current flow through them is blocked. The unipolar information switch which is to select the desired plane for receiving information current is comprised of a transistor switch which, when gated on, unblocks a number of bit diodes connected to the primary windings of the individual bit transformers and completing the electrical path from the bit driver circuit through the bit transmission line and to the bit transformer. This completed path enables energy of a proper polarity to be coupled to the individual bit conductors associated with the magnetic spots of the selected memory plane.

For a more thorough understanding of the invention, reference is now had to the drawings in which.

Figure 1:
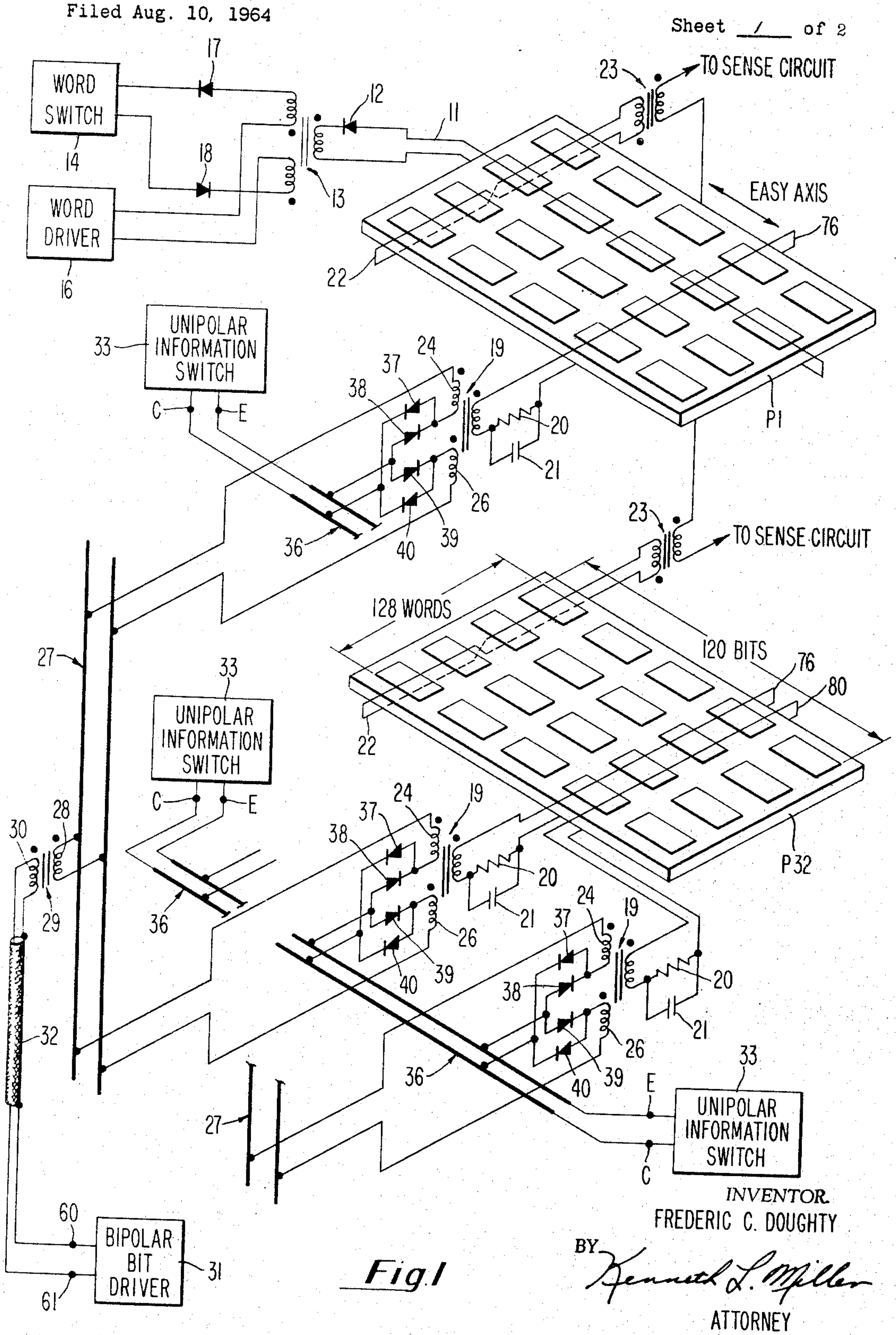
FIG. 1 illustrates in schematic form a memory matrix array in accordance with the present invention.

Referring now in detail to FIG. 1, there is illustrated a memory stack containing thirty-two separate memory planes P1–P32. Only the upper and lower plane has been shown in order to make the system more readily understood. Additionally, only typical information, sense, and write conductors have been illustrated for a better understanding of the invention. It is anticipated, however, that there will be conductors associated with each of the individual memory elements contained within the entire stack. Plane P1, by way of example, has been shown as containing 128 words with each word having 120 bits. The magnetic planes are made up of evaporated magnetic thin film elements of a nickel-iron alloy deposited on glass substrates. The films are 1000 A. thick; the glass is 0.2 mm. thick. Each rectangular spot measures 30 by 80 mils with cell spacing of 50 mil centers in the word direction and on 100 mil centers in the bit direction. The individual plane is in turn made up of separate groupings of thin film spots, there being twenty-four bits of a selected word in each group as well as thirty-two word columns. Plane P1 is shown as having a word line 11 which completely encircles the plane, by having a conductor end-around and a return of the conductor beneath the plane. A diode 12 confines current to a single direction through the word line. The word conductors are oriented parallel to the easy axis of magnetization of each of the deposited spots contained within the plane. Thus, when current is caused to flow through the conductor, a word or drive magnetic field is created substantially perpendicular to the easy axis of magnetization in the plane of the film. During a writing or interrogating operation, current for the word conductor 11 is generated through a transformer 13 connected to the conductor. Transformer 13 has two primary windings diode connected to a word switch 14 and a word driver 16. Diodes 17 and 18 are connected with respect to the word driver so as to cause additive currents through the respective primary windings of transformer 13. In operation a desired word is selected and causes word switch 14 to be closed. Thereafter at a desired time in the cycle, word driver 16 is energized causing an appropriate voltage to be induced in the secondary winding of transformer 13 thereby permitting a word current to flow through the selected conductor 11. Only one word out of the 4096 words of the memory stack is selected during a single operation.

Memory plane P1 also illustrates one of the 120 bit conductors being identified as bit line 76. Memory plane P32 in turn shows an additional pair of bit conductors 76 and 80. Each of the bit lines is connected to a bit transformer 19 through a parallel connection of a resistor 20 and a capacitor 21 located at the conductor line drive point. The resistor-capacitor combination serves to maintain a fairly uniform impedance for the driver circuit. A single sense conductor 22 is also illustrated for each of planes P1–P32. In order to minimize voltages induced into the sense circuit during the time when bit current flows through the bit conductors, the sense lines are caused to be crossed over at their midpoint to effectively cancel all induced voltages. It is understood that the bit lines could be transposed instead. The corresponding sense conductors for each of the thirty-two planes are effectively series connected through the sense transformers 23. Neither the sense circuits nor the word driver circuits forms an actual part of this present invention but are included solely for purposes of a clear understanding of the operation of the invention.

Each of the bit transformers 19 includes a pair of primary windings 24 and 26, although a single winding could be used in less demanding circumstances. The outer ends of the primary windings are connected to a transmission line 27 which is illustrated for convenience as a pair of parallel conductors of a form conventionally found in the distribution or transmission line art. Connected substantially midway between the top and the bottom of transmission line 27 is the secondary winding 28 of a transformer 29. Thus a transfer loop is formed between winding 28 and windings 24, 26. The primary winding 30 for that transformer is in turn driven by a single bipolar bit driver 31. In view of the space limitations in a memory stack such as that described, and also for a proper impedance match, the primary winding 30 may be connected to the bit driver 31 through a coax line such as the 50 ohm coax cable 32 illustrated in the drawing. It is understood that proper impedance matching and current levels may be obtained through the choice of suitable primary to secondary winding ratios for the individual transformers. The magnitude of the current flow is actually a fairly significant aspect of the present invention. In a constructed embodiment applicant has found that it is desirable to have 100 milliamps of current flowing through each of the bit conductors. However, in view of the large number of bits, fast operating transistor switches capable of carrying the large additive currents are currently unavailable. Applicant has chosen to use a 4:1 primary to secondary winding ratio so that the total primary current of each bit transformer only carries 25 milliamperes of current. Applicant incorporates a transistor unipolar information switch 33 in series with his primary windings of the individual bit transformers, and accordingly this transistor switch carries the same amount of current, i.e., 25 milliamperes. If there were fast operating transistor switches capable of carrying the primary winding 25 milliamps for each of the 120 bit lines in a selected plane, then one such transistor switch would be all that would be necessary for each plane. However, applicant has chosen to use transistor switches which are capable of carrying 300 milliamps each and thereby one such switch is able to handle twelve bit lines, resulting in a total of ten switches per plane. The individual switches 33 are closed during the initial address selection portion of the memory cycle when the word selection data is decoded and, thereafter during the cycle, the bit driver is caused to operate, thereby directing the bit current to the preselected plane having the closed switches. The unipolar information switch 33 is shown in block form in FIG. 1 and in more detail in the schematic presentation of FIG. 3.

Plane P32 illustrates two of the unipolar information switches out of the ten which would be simultaneously energized when selecting that particular plane. Each unipolar information switch 33 is connected to a small segment of a switch transmission line 36. As just described, each such switch and each such distribution line serves twelve bit conductors through transformers 19, although this is by way of illustration and not by way of limitation.

As already indicated, the outer ends of the primary windings 24 and 26 of the bit transformers 19 are connected to the vertical bit distribution lines which run the entire height of the stack. The inner ends of the two primary windings 24 and 26 are connected through a bridge network of four diodes 37, 38, 39 and 40 to be switch transmission line 36. The diodes are oppositely poled in pairs so that diodes 38 and 39 have their anodes connected together and to one of the pair of wires contained within switch transmission line 36. Diodes 37 and 40 have their cathodes connected together and to the other wire contained within switch transmission line 36. The inner end of winding 24 is then connected to the free terminal of diodes 37 and 38, whereas the inner end of winding 26 is connected to the free terminal of diodes 39 and 40. The connection between the switch transmission line 36 and the unipolar information switch 33 has been designated by separate terminals E and C, respectively. These terminals correspond to the emitter and collector electrodes of a switching transistor contained within the switch 33. The emitter terminal is normally biased negatively, whereas the collector terminal is normally biased positively so as to reverse bias the bit diodes 37–40 during the period when a unipolar information switch 33 is unselected. However, when the switch is selected, the transistor is caused to saturate, effectively connecting together the emitter and collector terminals, meanwhile unblocking the diodes 37–40 and permitting current flow through the respective primary windings 24 and 26 when the bit driver 31 is subsequently energized. One diode from each pair conducts positive current whereas the opposite two diodes conduct negative current.

Figure 2:
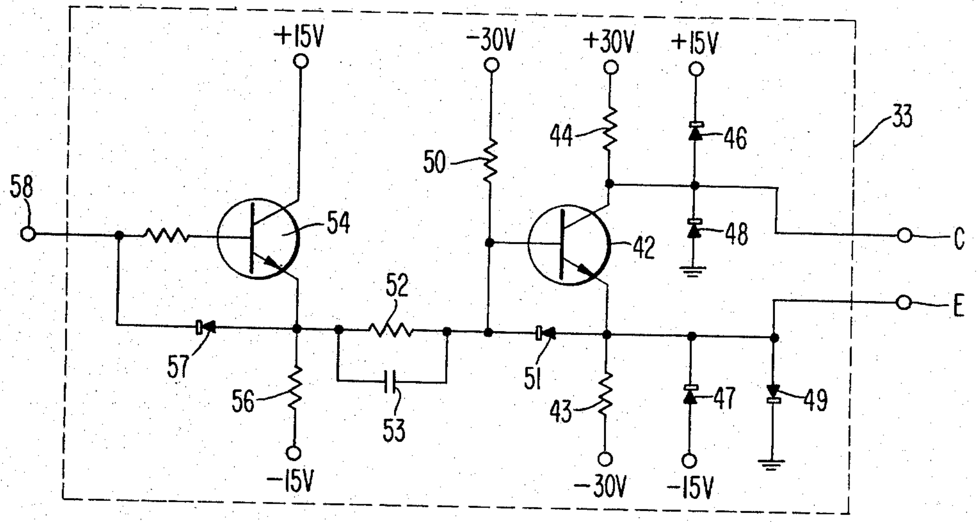
FIG. 2 illustrates a typical unipolar information switch which may be used in the FIG. 1 principal embodiment.

Referring specifically to FIG. 2, the phantom outline 33 corresponds to the unipolar information switch shown in block form in the FIG. 1 presentation. The output connections from the switch are designated E and C and correspond to the emitter and collector terminals shown in FIG. 1. The switching transistor 42 has its emitter electrode connected through a resistor 43 to a negative 30 volt supply. The collector electrode is connected through resistor 44 to a positive 30 volt supply. During cut off of the transistor 42, the collector terminal is clamped through diode 46 to a +15 volt level. Similarly, the emitter terminal is clamped through diode 47 to a −15 volt level. Return paths to ground are provided by diode 48 having its cathode connected to the collector of transistor 42 and by diode 49 having its anode connected to the emitter of transistor 42. The NPN transistor is normally biased off by a negative 30 volts supply connected through resistor 50 to the base of the transistor. Diode 51 connects between the emitter and base of the transistor. Input to the switching transistor is furnished through resistor 52 connected in parallel with capacitor 53 and having one end connected to the base of transistor 42 and the other end connected to the emitter of emitter follower NPN transistor 54. The driver circuit has a +15 volt collector supply and a −15 volt emitter supply furnished through emitter resistor 56. Diode 57 interconnects the base and emitter of the driver transistor. An input terminal 58 receives the desired decoded address information and causes transistor 42 to be driven into saturation, thereby closing the unipolar information switch for as long as the input is applied to terminal 58. In operation of the unipolar information switch it is seen that base to emitter current is furnished through diode 49 and both of the output terminals E and C are effectively connected together and maintained at approximately ground potential. This action removes the bias from the bridge connected bit diodes 37–40 and provides a current path for the bit driver current flowing through the primary windings 24 and 26 of the bit transformers.

Figure 3:
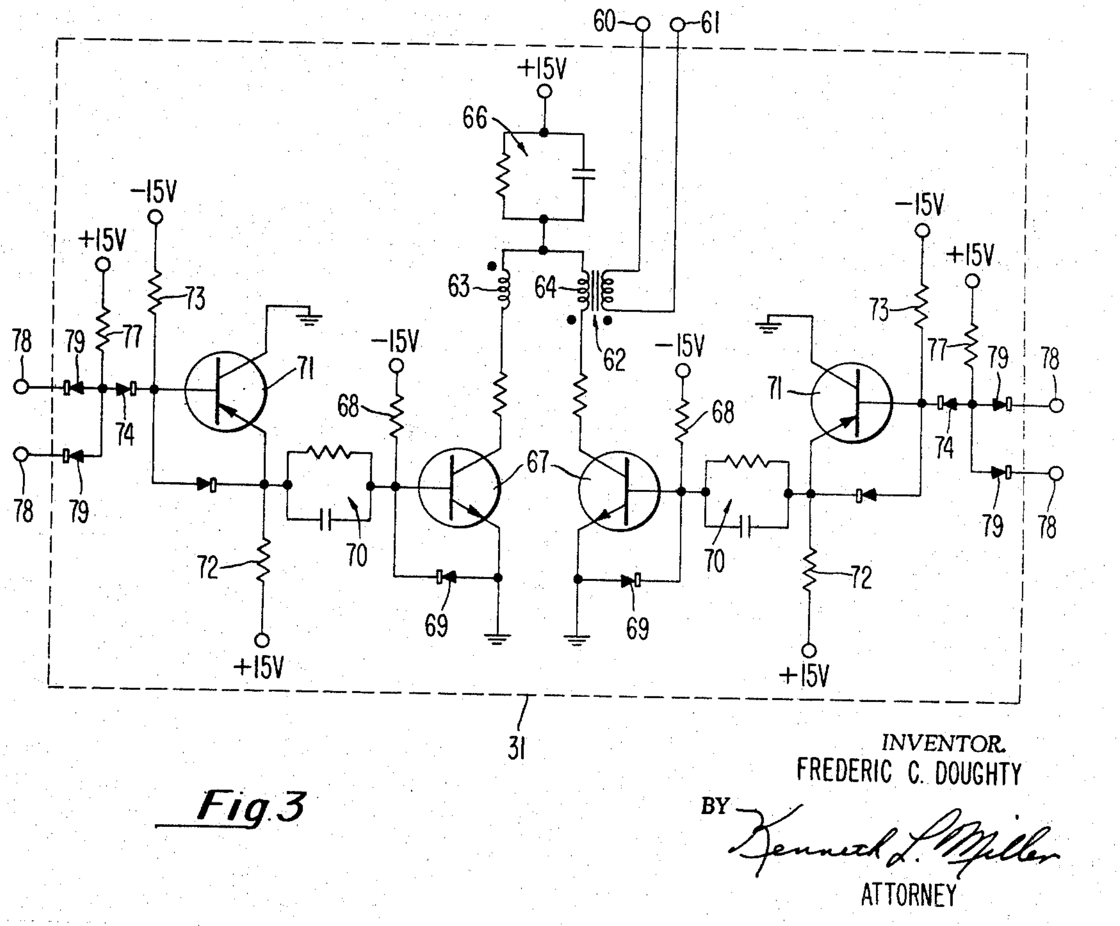
FIG. 3 shows a bipolar bit drive circuit for use in the FIG. 1 system.

The bipolar bit driver is illustrated more specifically in FIG. 3 and is shown within the outline 31. The output of the bit driver is found at terminals 60 and 61 which may be connected to the coaxial cable 32 shown in the organization of FIG. 1. Terminals 60 and 61 are in turn connected to the secondary winding of a bit driver transformer 62. The primary of that transformer is comprised of two separate windings 63 and 64 oppositely wound, as shown by the conventional dot notation which has been used throughout the drawings. The connections to primary windings 63 and 64 are identical and include connection to a +15 volt supply through a resistor-capacitor network 66. The other ends of the windings are resistor connected to the collector electrodes of identical NPN transistor switches 67. The emitter electrodes are connected to ground. The base supply is a negative 15 volts connected through resistor 68 and the base is also connected to the emitter through a diode 69. Input for the driver is furnished through a parallel R-C network 70 connected to the emitter of a PNP emitter follower 71. The collector of transistor 71 is ground connected, whereas the emitter is connected to a +15 volts supply through resistor 72. The base of transistor 71 is connected to a −15 volts supply through voltage dropping resistor 73 and is also connected to a +15 volt supply through diode 74 and resistor 77. The junction between resistor 77 and diode 74 is connected to a number of gating input terminals 78 through separate diodes 79. It is well recognized that the input circuit to transistor 71 serves as a conventional gating circuit so that the gating potentials, when applied appropriately to the input terminals, cause transistor 71 to furnish a positive voltage from its emitter to the base of driver transistor 67. Transistor 67 is then caused to be driven heavily into saturation generating an induced voltage at the secondary winding of driver transformer 62 and at output terminals 60, 61.

The gating input pulses include appropriate strobe clock pulses as well as the necessary selection logic to cause a selected one of the driver transistors 67 to saturate providing the appropriately timed plus or minus information current pulse. Identical circuits are used for both polarities in order to maintain a proper balance in the system. In the present bipolar driver operation, the input logic sequence also causes the opposite transistor 67 to saturate after the writing operation in order to rapidly quench the energy stored within the transformer cores. This second or restore pulse normally has a shorter duration than the first or information pulse.

Although the invention has been described primarily with regard to magnetic thin film elements, application proposes that other types of storage elements may be used. Also there is seen to be no restriction upon the big capacity of the system within the limits of the clock frequency and normal delays encountered in transmission lines and for necessary diode recovery time. Other changes and modifications which fall within the concepts of the disclosed invention may be made and applicant intends to be limited only within the scope of appended claims.

What is claimed is:

1. A memory driver circuit comprising, in combination, a conductor coupled to at least a single storage element for providing current pulses of a positive or negatiev polarity, a first transformer having an output winding and an input winding with said conductor connected to said output winding, a second transformer having an output winding and at least one input winding, a transfer loop interconnecting the output winding of said second transformer with the input winding of said first transformer, said transfer loop including a four legged bridge circuit with a diode in each leg, opposite ends of said bridge circuit connected to said loop, the intermediate ends of said bridge circuit having a single switching means connected thereacross, said diodes being connected such that one end of said switching means connects to the anode electrodes of two of said diodes and the other end of said switching means connects to the cathode electrodes of the other two of said diodes, input means connected to said switching means for selectively opening or closing said switching means to control the interconnection of the transformers through said loop, and a current source connected to said at least one input winding of said second transformer for causing a pulse of current to flow in a first or a second direction through said transfer loop when said switching means is closed to thereby be transformer-coupled to said conductor in a first or a second polarity.

2. A memory driver circuit as recited in claim 1 wherein said switching means is a transistor switch having an emitter electrode connected to one of said bridge intermediate ends and a collector electrode connected to the other of said bridge intermediate ends.

3. A memory driver circuit as recited in claim 1 wherein said current source comprises a pair of transistor switches connected to a pair of separate input windings oppositely oriented with respect to one another and including input circuit means for causing one or the other of said transistor switches to conduct current.

4. A memory driver circuit as recited in claim 3 wherein said input circuit means causes one of the other of said transistor switches to conduct followed in time sequence by conduction of the opposite one of said switches for a controlled time duration so as to rapidly quench an undesired transformer magnetizing current.

5. A memory driver circuit as recited in claim 1 wherein said single switching means is commonly connected across the intermediate ends of the bridge circuit of at least a second transfer loop, said second transfer loop likewise including an output winding of a second transformer and an input winding of a first transformer, said at least a second transfer loop being transformer coupled to at least a second conductor coupled to a further storage element and to a second current source for causing a pulse of current to flow in a first or a second direction through said second transfer loop so long as said commonly connected switching means is closed.

6. A memory driver circuit as recited in claim 1 wherein said switching means includes a bias means for reverse biasing said diodes when said switching means is open and which is removed when said switching means is closed.

7. A memory driver circuit as defined in claim 1 wherein said conductor coupled to said storage element includes a parallel resistor-capacitor network located at the first transformer output winding drive point to minimize the load variation as seen by the input current source.

8. A memory driver circuit comprising, in combination, a conductor coupled to at least a single storage element for providing current pulses of a positive or negative polarity, a first transformer having a secondary winding and a pair of primary windings, said conductor being connected to said secondary winding, a second transformer having at least one primary winding and a secondary winding, connecting means between the ends of the secondary winding of said second transformer and one end of each of said primary windings of said first transformer, the opposite end of each of said primary windings of said first transformer being connected to one terminal of a separate pair of oppositely poled diodes, thereby including four separate diodes, the opposite terminal of each of said diodes of said separate pairs of diodes having a single switching means connected therebetween, input means connected to said switching means for selectively opening or closing said switching means to control the current path interconnection of the said opposite ends of said primary windings of said first transformer through one diode of each of said pairs of diodes for each direction of current flow, to thereby enable a closed transfer loop between the primary windings of said first transformer and the secondary winding of said second transformer, and a current source connected to said at least one primary winding of said second transformer for causing a pulse of current to flow in a first or a second direction through said transfer loop when said switching means is closed to thereby be coupled to said conductor in a first or a second polarity.

9. A memory driver circuit as recited in claim 8 wherein said current source comprises a pair of electronic switches connected to a pair of separate primary windings oppositely oriented with respect to one another and including input circuit means for causing one or the other of said electronic switches to conduct current.

10. A memory driver circuit as recited in claim 9 wherein said input circuit means causes one or the other of said electronic switches to conduct followed in time sequence by conduction of the opposite one of said switches for a controlled time duration so as to rapidly quench an undesired transformer magnetizing current.

11. A memory driver circuit as recited in claim 8 wherein said single switching means is commonly connected in series with at least a second transfer loop, said second transfer loop like-wise including an output winding of a second transformer, an input winding of a first transformer and two separate pairs of oppositely poled diodes, said at least a second transfer loop being transformer coupled to at least a second conductor coupled to a further storage element and to a second current source for causing a pulse of current to flow in a first or second direction through said second transfer loop so long as said commonly connected switching means is closed.

12. In a magnetic memory storage system, the combination comprising at least a single plane of magnetic storage elements arranged in a matrix of rows and columns, a row conductor for each of said rows coupled to the magnetic elements thereof, a separate information transformer having an input winding and having a single output winding connected to each row conductor, said row conductors having their opposite ends connected to said transformer output windings, a four diode bridge circuit connected to the input winding of each information transformer, said diodes being oriented to permit current flow in a first direction in series through two of said diodes and said input winding and in a second direction in series through the remaining two diodes and said input winding, a separate input source for each of said information transformer input windings for selectively providing a desired direction of information current flow, and a single switching means connected across said diode bridge circuit of a plurality of said circuits for controlling and carrying the information current flow of said plurality of circuits.

13. A magnetic memory system comprising a plurality of planes of thin film magnetic memory elements, said elements arranged in discrete spots on each plane on a substrate in rows and columns, separate word conductors for each column of each plane and coupled to the memory elements thereof, separate information conductors for each row of each plane and coupled to the memory elements thereof, separate since conductors for each row of each plane and coupled to the memory elements thereof, said sense conductor for each row having an upper and a lower portion encircling said row of memory elements and having the upper and lower portion transposed with respect to one another along its length, each of the corresponding row information conductors in said plurality of planes being connected in parallel to a single source of information current of a desired current direction for storing information in a bit position of a selected word during a write operation, separate information current steering means associated with each of said planes for blocking information current flow through the information conductors of all but a single desired one of said planes, thereby restricting information currents to a single plane during a write operation and minimizing undesired noise which might be induced into said sense conductors and further minimizing undesired time delays since the information current is not required to flow through each of said plurality of planes.

14. A magnetic memory system as defined in claim 13 wherein the remaining corresponding row information conductors in each of said planes are similarly connected to further separate information current sources.

15. A magnetic memory system as defined in claim 14 wherein the separate information current steering means includes a transistor switch which is commonly connected to control information current flow through a plurality of bit conductors of a selected word plane.

16. A magnetic memory system as defined in claim

13 wherein said information current steering means includes a four legged network with diodes in at least two legs oriented with respect to one another to provide current flow in one direction through one of said diodes and in the opposite direction through the remaining one of said diodes and a switching means connected to reverse bias said diodes when said switching means is open and to remove said bias and permit current flow therethrough when closed so as to control the desired plane to which said information current is directed.

17. A magnetic memory system as defined in claim 16 where in said switching means is a transistor switch having its emitter-collector path connected to carry the information current of a plurality of information conductors within a single selected plane.

18. A magnetic memory system as defined in claim 17 wherein said single source of information current comprises a transformer having one winding connected to said information conductor and a further pair of windings connected to separate bit driver transistors which are energized selectively to induce current flow into said information conductor in a first or a second direction.

19. A magnetic memory system as defined in claim 18 wherein said bit driver transistors are controlled to cause one or the other to conduct followed in time sequence by conduction of the other for a controlled time duration.

References Cited

UNITED STATES PATENTS

| | | | |
|---|---|---|---|
| 2,988,732 | 6/1961 | Vinal | 340—174 |
| 3,164,810 | 1/1965 | Harding | 340—174 |
| 3,192,510 | 6/1965 | Flaherty | 340—174 |
| 3,195,114 | 7/1965 | Gunderson et al. | 340—174 |
| 3,267,446 | 8/1966 | Woods et al. | 340—174 |
| 3,315,238 | 4/1967 | James | 340—174 |

OTHER REFERENCES

IRE Transactions on Electronic Computers, "A Transistor-Driven Magnetic-Core Memory," by E. L. Younker, March 1917, p. 18 and 19.

STANLEY M. URYNOWICZ, Jr., *Primary Examiner.*